United States Patent

Lamport et al.

[11] Patent Number: 5,753,018
[45] Date of Patent: May 19, 1998

[54] RESIN MIXTURE FOR FRICTION MATERIALS

[75] Inventors: Robert Anthony Lamport, Centerville; Julie Mary Biermann-Weaver, Jamestown; Vinod Kumar Jain, Kettering; Peter Teh-Kwang Shih, Centerville, all of Ohio

[73] Assignee: General Motors Corporation, Detroit, Mich.

[21] Appl. No.: 839,568

[22] Filed: Apr. 14, 1997

[51] Int. Cl.$^6$ .............................. C09K 3/14; C09K 5/14; C08J 5/14

[52] U.S. Cl. .............................. 106/36; 523/149; 523/156; 523/157

[58] Field of Search .............................. 106/36; 523/149, 523/156, 157

[56] References Cited

U.S. PATENT DOCUMENTS

| | | | |
|---|---|---|---|
| 4,954,536 | 9/1990 | Komori et al. | 523/149 |
| 5,147,588 | 9/1992 | Okura et al. | 264/29.7 |
| 5,279,777 | 1/1994 | Kojima et al. | 264/29.5 |
| 5,344,854 | 9/1994 | Ohya et al. | 523/149 |
| 5,411,773 | 5/1995 | Ohya et al. | 428/1 |

FOREIGN PATENT DOCUMENTS

| | | | |
|---|---|---|---|
| 2925265 | 1/1981 | Germany | 106/36 |
| 61-258884 | 11/1986 | Japan | 106/36 |
| 61-258885 | 11/1986 | Japan | 106/36 |
| 63-163025 | 7/1988 | Japan | 106/36 |
| 2-057734 | 2/1990 | Japan | 106/36 |

OTHER PUBLICATIONS

Kirk–Othmer, "Encyclopedia of Chemical Technology", 4th edition, vol. 4, pp. 523–536 (1992). No Month.
Chemical Abstract No. 96:37444 which is an abstract of Japanese Patent Specification No. 56–038811 (Feb. 1976).
Chemical Abstract No. 110:194371 which is an abstract of Japanese Patent Specification No. 63–291944 (Nov. 1988).
Chemical Abstract No. 119:232362 which is an abstract of Japanese Patent Specification No. 05–156236 (Jun. 1993).
Chemical Abstract No. 124:178540 which is an abstract of Japanese Patent Specification No. 07–332414 (Dec. 1995).
WPIDS Abstract No. 85–111571 which is an abstract of German Patent Specification No. 3,437,800 (May 1985).
WPIDS Abstract No. 91–242336 which is an abstract of Japanese Patent Specification No. 03–157456 (Jul. 1991).
WPIDS Abstract No. 93–172771 which is an abstract of Japanese Patent Specification No. 05–105869 (Apr. 1993).

*Primary Examiner*—Anthony Green
*Attorney, Agent, or Firm*—George A. Grove

[57] ABSTRACT

An improved friction material composite is disclosed that contains a fibrous reinforcing constituent, various friction imparting and controlling additives, and a thermosetting resin mixture in which mixture is contained pitch, a polyimide resin, and optionally a phenolic resin. Pitch-polyimide mixtures can be formulated to provide unusually high temperature resistance and strength and the pitch-polyimide-phenolic resin mixtures formulated to provide like properties at moderate cost.

5 Claims, 1 Drawing Sheet

RESIN MIXTURE FOR FRICTION MATERIALS

TECHNICAL FIELD

This invention relates to improved binder resin mixtures for friction materials in general and for vehicular brake linings in particular.

BACKGROUND OF THE INVENTION

Phenolic resins are the most commonly used binders for friction materials. They are available at low cost. They are usually readily mixed with other constituents of the friction material composite and therefore may be used in relatively high content. They offer temperature resistance to temperatures of the order of 600° F., and they char to a high carbon content. Virtually every manufacturer of automotive friction materials uses phenolics as the binder. However, phenolic resins are not without their limitations.

The actual temperature at the wear surface during vehicle braking can range from room temperature to greater than 1700° F. This latter temperature is hot enough to decompose phenolics and similar organics by high temperature oxidation. The phenolic resin first chars, which means it is converted to carbon accompanied by loss of mass, and then ablates into carbon dioxide. The mass loss during decomposition is significant to the increased wear rate of a friction material composite for two reasons. The first is that as the density at the wear surface is reduced, porosity is simultaneously increased. For a given composite composition, wear life is inversely proportional to porosity. Secondly, as the resin degrades, the reinforcing fibers detach and the composite loses structural integrity at the wear surface. When this happens, the wear rate of the composite increases greatly. It is, therefore, desirable to have a resin system with both a high decomposition temperature and a high char yield.

Phenolics are also inherently quite brittle. For this reason, in friction material composites, they are modified with tougheners such as epoxy resin, rubber particles, or polymerized cashew oil at levels up to 20 volume percent of the resin content to minimize cracking of the composite. Frequently, rubber or cashew oil particles are directly added to the friction material to perform the same function. Both practices reduce the high temperature limit and the high char yield of a phenolic binder composite. Therefore, it is desired to provide an improved resin with increased toughness as measured by compressive strain to failure that will minimize the need for toughening additives as required by phenolics and raise the decomposition/ char yield (as compared to phenolic resin) of a resin-bonded composite.

Alternatives to phenolics have been made available for years, but their use has been limited to specialized applications. Polyimides, pitches, silicone resins, epoxy resins, bismaleimides, vinyl esters, polybenzimidazole resins and others have all been evaluated in friction materials. In many cases, these non-phenolic resins have provided substantial gains in structural and thermal performance. However, there have always been other significant limitations which have prevented their use in all but the most specialized applications. None have proven entirely satisfactory for automotive friction material applications. The reasons for these results include low strength, low particulate loading capability, low char yield, undesirable decomposition products (for example, silicones convert to beach sand) and non-commercial molding or curing procedures and exceptionally high costs. Some of the evaluated resin binders such as coal tar and petroleum pitches are quite brittle, despite having a low cost and a high char yield.

Accordingly, there is a need to devise a resin binder system suitable for mass manufacturing of automotive friction materials such as brake linings. The resin system must be capable of ease of processing with the other friction material additives. It must provide suitable cost, together with high temperature resistance, char yield and toughness.

SUMMARY OF THE INVENTION

This invention provides an improved binder resin mixture that is particularly suitable for automotive brake lining compositions and is generally applicable to all friction materials. Expressed in parts by weight, the resin mixture of this invention comprises one part petroleum or coal tar pitch, 0.4 to 0.6 part of a polyimide resin, and 0 to 5 parts of a thermosetting phenolic resin. The pitch-polyimide resin mixtures (i.e., phenolic resin free) are preferred when high temperature resistance and toughness are required in applications where cost is not a prime consideration. However, in many automotive brake applications, the preferred resin mixture of this invention comprises one part pitch, 0.4 to 0.6 parts polyimide resin, and 0.5 to 4 parts, especially 1 to 2 parts, phenolic resin.

The resin mixture is preferably initially provided in liquid form to facilitate interaction of the resin components and mixing with other components of the brake lining or other friction component product. Such liquidity may be provided by use of a solvent (transient or reactive) or by selection of an initially liquid phenolic resin component. When the phenolic resin component is present, it is also desired that the initial liquid resin mixture contain a suitable amount of a catalyst such as methyl para-toluene sulfonate or hexamethylenetetramine as a catalyst for the phenolic resin cure. When a solvent is used in conjunction with the phenolic resin, it is preferable to use furfuraldehyde or furfuryl alcohol. When no phenolic resin is employed as a constituent of the resin mixture, an alcohol solvent such as methanol may be employed for the pitch-polyimide resin mixture.

In accordance with the invention, the initially liquid pitchpolyimide or pitch-polyimide-phenolic resin mixture is mixed with other suitable and desired brake lining constituents such as a friction particle constituent, a lubricating constituent comprising, for example, graphite coke, calcium fluoride and/or antimony sulfide, and a reinforcing fiber constituent such as aramid or polyacrylonitrile fibers, and the like. These other friction material constituents will vary from composition to composition, but the subject two-part or three-part resin mixture offers high temperature resistance, high char yield, high toughness and, when the phenolic resin constituent is used, low cost potential for the overall friction material composition.

These and other objects and advantages of this invention will become more apparent from a detailed description thereof which follows.

DESCRIPTION OF PREFERRED EMBODIMENTS

Figure 1:
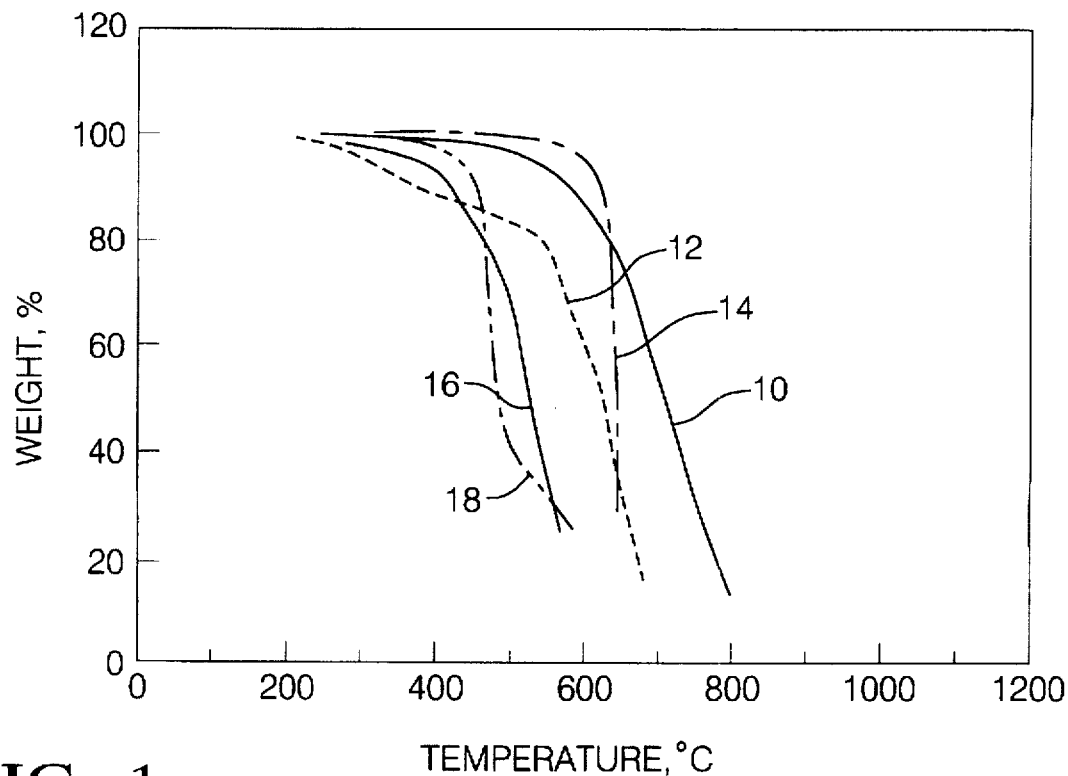
FIG. 1 is a thermal gravimetric analysis (TGA) plot of sample weight loss with increasing temperature for the PX-12 pitch-polyimide resin of Example 1. Also included in the plot are data for relevant comparative resis.

A brake lining material is often made of (a) fibrous materials such as steel or aramid fibers for reinforcement, (b)

abrasive particles such as magnesium oxide or zirconium oxide. (c) anti-wear materials such as graphite, petroleum coke, antimony trisulfide and calcium fluoride, (d) fillers such as barium sulfate and rubber particles, and (e) resin binders such as phenolic resins to hold all of the above ingredients together and to form a useful brake pad after molding and curing at high temperatures and pressures. The resin binder is a critical component. The limits of heat resistance and strength of the frictional material are governed largely by the heat resistance and strength of the resin binder.

This invention is related to a resin binder system having higher temperature resistance than the conventional phenolic resins that are used in friction materials. It is also often more processable than conventional phenolic resin mixtures and produces brake pads that are tougher and provide more uniform or stable friction properties, especially at high operating temperatures. This proposed system consists essentially of mixtures of specific ratios of pitches, polyimides and phenolic resins. For example, the weight ratios are one part pitch to 0.4 to 0.6 parts polyimide to 0 to 5 parts phenolic, preferably 1 to 2 parts phenolics.

Coal tar pitch and petroleum pitch are each types of residues remaining after high temperature carbonization and/or distillation of bituminous coal or petroleum. Coal tar pitches are usually more aromatic and more highly condensed organic molecules than petroleum pitches and therefore provide a higher carbon yield. The coal tar pitch materials contain polycyclic $C_{23}H_{14}$, $C_{27}H_{18}$ and other aromatic organic molecules with molecular weights in the 100 to 5000 range. Examples of suitable pitches for use in the resin binder systems of this invention include a coal tar pitch from Allied Signal Corporation (Morristown, N.J.) with constituents having molecular weights in the 700 to 900 range and a melting range of 60° C. to 150° C. Another example of a suitable pitch is a petroleum pitch A-240 from the Ashland Petroleum Company (Ashland, Ky.). This petroleum pitch has a higher molecular weight with a softening point above 120° C.

Polyimides are a group of high molecular weight polymers having an imide group, -(CONHCO)- or -(CONCO)-, in each repeat unit of the polymer chain. An example of a polyimide resinous polymer suitable for use in the resin bonding systems of the subject invention is SuperImide 800 (a product from B. F. Goodrich), an addition type polymer of the polyimide type. This polyimide consists essentially of aromatic organic moieties with polyimide linkages. As provided, such polymers are formed with amine end groups or dianhydride end groups which permit crosslinking into a thermoset material. The thermoset SuperImide 800 polymer and other suitable polyimide resins have glass transition temperatures in the range of 660° F. to 840° F.

As stated above, it is expected there will be some high performance friction material applications or brake lining applications in which the pitch and polyimide combinations within the above-stated ranges will serve well because of their high temperature and high strength properties. However, due to the expense of the high amount of polyimide resin in such two component resin binder formulations, the mixture will be relatively expensive. Therefore, in other lower cost resin mixtures, the pitch and polyimide resins will be combined with a suitable phenolic resin(s) in the range of about 0.5 to 4 parts, preferably 1 to 2 parts, total phenolic resin. Such three resin mixtures can be formulated to provide an excellent balance of high temperature properties, toughness and cost.

Phenolic resins are a class of synthetic materials that have grown in usage over seven decades. The principal building blocks of phenolic resins are usually phenol and formaldehyde. For friction materials applications, the starting materials for the thermosetting phenolic resins are usually of two types. Resole resins are made with an alkaline catalyst and a molar excess of formaldehyde with respect to phenol. Novolak or novolak resins are prepared with an acid catalyst and less than one mole of formaldehyde per mole of phenol. Some novolak resins are prepared as resolated novolaks. The initial reaction involved in the preparation of resolated novolaks is carried out with an acid catalyst in less than a one to one mole ratio of formaldehyde to phenol. After formation of the novolak, the pH is adjusted so that the reaction mixture is basic and additional formaldehyde is added. Resole and resolated novolaks are inherently thermosetting and require no curing agent for conversion to a crosslinked infusible mass. Novolaks, by comparison, are thermoplastic and require the addition of a curing agent, the most common one being hexamethylenetetramine. As the molecular weight of the phenolic resin is increased, the phenolic polymer is first liquid and then solid. With increasing molecular weight, the phenolic solid resin may be soluble in certain organic solvents and fusible. With further increase in molecular weight, the solid resin is insoluble but swelled by organic solvents and, although softened by heat, exhibits essentially no flow. Finally, in its most crosslinked state, the solid phenolic resin is insoluble, infusible product which is not swelled by solvents or softened by heat.

In the illustration of the subject invention, illustrations of suitable phenolic resins include FurCarb LP-520, a furfuryl-alcohol phenolic resin made by QO Chemical, a subsidiary of Great Lake Chemical Corporation. Another example of a suitable phenolic resin is FL-522A, a phenolic resin prepared by Borden. Other suitable phenolic resins for use in brake linings are Schenectady Corporation's HRJ-1797, HRJ-1871 and HRJ-12581.

The invention will be further illustrated by examples.

Example 1

The PX-12 Resin

The PX-12 resin was made by mixing one part by weight of an aromatic coal tar pitch with 0.4 parts by weight Superimide 800 and 0.5 parts by weight furfuraldehyde. The mixture was heated at a temperature up to 200° F. The dark liquid mixture was quite fluid, and the pitch and Superimide 800 appeared to have dissolved. The fluid was cooled to about 140° F., and 0.3 parts by weight methyl p-toluene sulfonate catalyst material was added.

A purpose of this experiment was to cure this resin mixture of pitch and polyimide resins for the purpose of conducting a thermal gravimetric analysis (TGA) under nitrogen environment to obtain a quantitative measure of the thermal resistance of the resin. However, it is to be noted that in the practical process of preparing a friction material composition such as a brake lining composition, the other friction material components such as those identified above would be incorporated with the liquid resin at this stage of the resin preparation.

In the case of this experiment, the liquid resin was slowly heated in a muffle furnace to a temperature of 600° F. and held at that temperature for about two hours. In the course of this heating, the furfuraldehyde was either reacted into the resin during a curing process or evaporated. The intercured two resin mass was then cooled and comminuted to a fine resin particle for purposes of running a thermal gravimetric analysis on the material.

For purposes of comparison, like TGA data was obtained on (a) the aromatic pitch starting material, (b) the SuperImide 800 starting material, and (c) a commercial novolak phenolic resin and catalyst of the type currently used in commercial brake lining materials by the assignee of this invention. Also subjected to a like TGA test was a cashew nut liquid resin and catalyst, also a commercial brake lining resin material used by the assignee of this invention. Before the TGA test, these materials were separately heated in a muffle furnace at 600° F. for two hours. The TGA test was conducted at a heating rate of 10° C. per minute under a nitrogen atmosphere. The data from the TGA test is presented in FIG. 1. The PX-12 TGA plot is indicated at curve 10, the pitch data at 12, the SuperImide 800 data at 14, the novolak phenolic resin data at 16 and the cashew nut liquid resin data at 18.

It is seen that PX-12 resin has markedly greater thermal stability (low weight loss at high temperature) than the commercial novolak phenolic resin and the commercial cashew nut liquid resin as well as either starting material. The difference at 50% weight loss, for example, is at least 150° C. It is further seen that the premixing of the pitch and polyimide in a liquid state followed by curing produces a cured resin with better temperature resistance than either starting material alone.

Example 2

The PX-32 Resin

In this example, a binder resin mixture consisting by weight of one part of an aromatic coal tar pitch, 0.51 parts of SuperImide 800 polyimide resin, 0.67 parts LP-520 phenolic resin, 0.2 parts methyl p-toluene sulfonate catalyst, 1.14 parts furfuryl alcohol and 0.2 parts of Asbury Graphite Mill's 5345 carbon black was prepared as described above. A liquid mixture in which most of the resin was dissolved was prepared by heating the furfuryl alcohol to a temperature of about 200° F. The fluid mixture was cooled to about 140° F., and the MPTS catalyst was added with stirring.

Once again, the purpose of formulating this resin was for the conduct of a thermal gravimetric analysis. However, in the practical preparation of a disk brake pad or drum brake lining or the like, the other brake lining constituents such as those described above would be mixed with the liquid thermosettable resin at this stage of the processing, and the mixture would be molded and cured by known practices.

Figure 2:
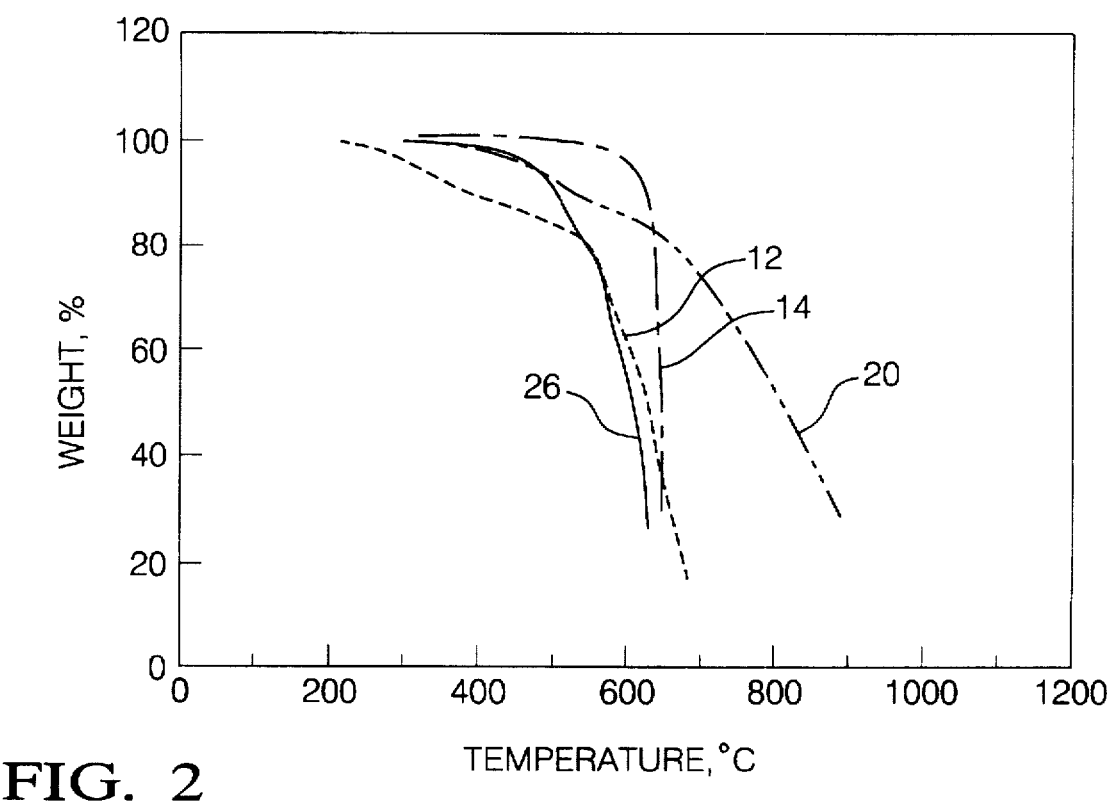
FIG. 2 is a TGA plot for the PX-32 pitch-polyimide-phenolic resin of Example 2. Also included in the plot are data for relevant comparative resins.

In the case of this example, the mixture was slowly heated to a temperature of 600° F. It was held at 600° F. for about two hours. Thereafter, the cured, initially three constituent solid resin body was comminuted into a fine powder and subjected to a thermal gravimetric analysis by heating under nitrogen at a rate of 10° C. per minute. The resulting data for the PX-32 material is presented in FIG. 2 at curve 20. For comparison, also included is the like TGA data for the SI-800 polyimide (curve 14) resin for the pitch (curve 12) and for the LP-520 phenolic resin and MPTS catalyst (curve 26). These three materials were also heated at 600° F. for two hours before the TGA tests. It is seen that the thermoset mixture of the three materials is substantially better in thermal resistance than any of the individual constituents.

Example 3

Brake Lining Performances

A current commercially-employed brake lining formulation contains aramid reinforcing fibers; zirconium oxide abrasive particles; a lubricant constituent of graphite, antimony sulfide ($Sb_2S_3$), calcium fluoride and coke particles; rubber and barium sulfate filler particles; and a three component phenolic resin. The phenolic resin binder consists, in parts by weight, nominally of 30% of the HRJ-1797 phenolic resin identified above, 40% HRJ-1871 and 30% HRJ-12581. A brake lining composite material was made by mixing the above constituents in a commercial brake lining mixer. Brake lining parts were then molded and compressed at 375° F., 5000 psi pressure for six minutes. The brake lining material was then post-cured by heating at a temperature from 300° F. to 400° F. over a period of 10 hours. As stated, the above represents substantially a currently employed commercial brake lining material. For purposes of this example, it is designated 566-0 brake pad composition.

For purposes of demonstrating this invention, a like friction material was prepared and molded with the exception that the three constituent phenolic resins employed in the 566-0 material were not used. Rather, the following resin mixture was employed. The mixture consisted, in terms of parts by weight, of one part petroleum pitch, 0.47 parts SI-800 polyimide resin, and 4.68 parts FL-522A phenolic resins, including 0.10 parts of hexamethylenetetramine catalyst. The phenolic resin was initially liquid, and this facilitated the mixing of the pitch and the polyimide resin with the phenolics material. The liquid mixture was mixed with the aramid fibers, zirconia particles, graphite and other constituents identified above to produce a molded brake pad using the resin mixture of this invention. This brake pad was designated 566-BH. The brake pads, i.e., the 566-0 brake pad material and the 566-BH brake pad material, were assembled into brake assemblies and tested on brake dynamometers in accordance with normal brake formulation test procedure evaluations as conducted on all candidate brake liner materials. A typical test is to repeatedly apply braking pressure on the pads to reduce car speed, and in the mean time record the torque, brake application pressure (to calculate specific torque) and the average rotor temperatures. This section of the test is comprised of about 100 of these brake applications. It is repeated eight times in succession during the schedule or the car test. It was found in these tests that the brake lining material 566-BH demonstrated greatly improved friction stability over the 566-0 lining material in these brake dynamometer tests. Furthermore there was less pad wear with the 566-BH material, 0.084 inch as compared to the 566-0 brake pad material 0.093 inch.

The 566-0 and 566-BH formulations were also molded into hockey puck disks 1.5 inches in diameter and ³⁄₁₆ of an inch thick at 200 psi and 350° F. for eight minutes. They were post-cured for three hours at 400° F. and three hours at 600° F. The purpose of preparing these test samples was to determine the maximum force to puncture, crack or break the center of the disk—in other words, the break strength of the material. After cooling to room temperatures, the respective formulations were thus tested. The break strength of the 566-0 present commercial lining material was in the range of 113 to 152 maximum pounds force, whereas the break strength of the 566-BH lining material was in the range of 156 to 179 maximum pounds force.

The subject cured together pitch-polyimide-phenolic and pitch-polyimide resin mixtures demonstrate improved high temperature resistance, toughness and other desirable binder properties when employed in friction materials, especially brake lining materials. While the invention has been described in terms of a few specific embodiments thereof, it will be appreciated that other forms could readily be adapted by those skilled in the art. Accordingly, the scope of the invention is intended to be limited only by the following claims.

We claim:

1. In a friction material composition which is the molded and thermoset reaction product of a mixture comprising a fibrous reinforcing constituent and a thermosetting resin, the improvement in which said thermosetting resin initially consists essentially of a uniform mixture, expressed in parts by weight, of one part pitch, 0.4 to 0.6 parts of a polyimide resin and 0 to 5 parts of a thermosetting phenolic resin, the constituents of said mixture being cured together in said thermoset reaction product.

2. In a friction material composition which is the molded and thermoset reaction product of a mixture comprising a fibrous reinforcing constituent and a thermosetting resin, the improvement in which said thermosetting resin initially consists essentially of a homogeneous liquid mixture, expressed in parts by weight, of one part pitch, 0.4 to 0.6 parts of a polyimide resin and 0 to 5 parts of a thermosetting phenolic resin, the constituents of said mixture being cured together in said thermoset reaction product.

3. A friction material composition as recited in claim 1 in which the content of the thermosetting phenolic resin is in the range of 0.5 to 4 parts by weight.

4. A friction material composition as recited in claim 2 in which the content of the thermosetting phenolic resin is in the range of 0.5 to 4 parts by weight.

5. A friction material composition as recited in claim 2 in which said thermosetting resin consists essentially of one part pitch, 0.4 to 0.6 parts polyimide, 0.5 to 4 parts phenolic resin, and a solvent selected from the group consisting of furfuraldehyde and furfuryl alcohol.

* * * * *